United States Patent
Ro et al.

(10) Patent No.: US 11,704,018 B2
(45) Date of Patent: Jul. 18, 2023

(54) MEMORY MANAGEMENT DEVICE CAPABLE OF MANAGING MEMORY ADDRESS TRANSLATION TABLE USING HETEROGENEOUS MEMORIES AND METHOD OF MANAGING MEMORY ADDRESS THEREBY

(71) Applicant: SK hynix Inc., Gyeonggi-do (KR)

(72) Inventors: Won Woo Ro, Gyeonggi-do (KR); Hyun Jae Oh, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/026,963

(22) Filed: Sep. 21, 2020

(65) Prior Publication Data

US 2021/0096745 A1    Apr. 1, 2021

(30) Foreign Application Priority Data

Sep. 27, 2019 (KR) .......................... 10-2019-0119553

(51) Int. Cl.
*G06F 3/06* (2006.01)

(52) U.S. Cl.
CPC .......... *G06F 3/0604* (2013.01); *G06F 3/0659* (2013.01); *G06F 3/0673* (2013.01)

(58) Field of Classification Search
CPC ..... G06F 3/0604; G06F 3/0659; G06F 3/0673
See application file for complete search history.

(56) References Cited

U.S. PATENT DOCUMENTS

| 7,024,536 B2 * | 4/2006 | Park .................... G06F 12/1027 711/206 |
| 8,631,206 B1 | 1/2014 | O'Bleness et al. |
| 9,898,409 B2 | 2/2018 | Sethia et al. |
| 10,303,597 B2 | 5/2019 | Jung |
| 2004/0073768 A1 * | 4/2004 | Bottemiller .......... G06F 12/123 711/E12.072 |
| 2019/0026230 A1 * | 1/2019 | Lu ........................ G06F 12/0891 |

FOREIGN PATENT DOCUMENTS

| JP | 2015-184794 A | 10/2015 |
| KR | 10-0959014 | 5/2010 |
| KR | 10-2018-0051326 A | 5/2018 |
| KR | 10-2018-0120221 A | 11/2018 |
| KR | 10-2019-0002473 | 1/2019 |
| KR | 10-2144491 | 8/2020 |

OTHER PUBLICATIONS

Stratton et al., Parboil: A Revised Benchmark Suite for Scientific and Commercial Throughput Computing, Impact Technical Report, Mar. 2012, p. 1-p. 11, Impact-12-01, University of Illinois at Urbana-Champaign, Champaign, USA.

* cited by examiner

Primary Examiner — Gary W. Cygiel
(74) Attorney, Agent, or Firm — IP & T Group LLP

(57) ABSTRACT

Provided are a GPU and a method of managing a memory address thereby. TLBs are configured using an SRAM and an STT-MRAM so that a storage capacity is significantly improved compared to a case where a TLB is configured using an SRAM. Accordingly, the page hit rate of a TLB can be increased, thereby improving the throughput of a device. Furthermore, after a PTE is first written in the SRAM, a PTE having high frequency of use is selected and moved to the STT-MRAM. Accordingly, an increase in TLB update time which may occur due to the use of the STT-MRAM having a low write speed can be prevented. Furthermore, a read time and read energy consumption can be reduced.

14 Claims, 6 Drawing Sheets

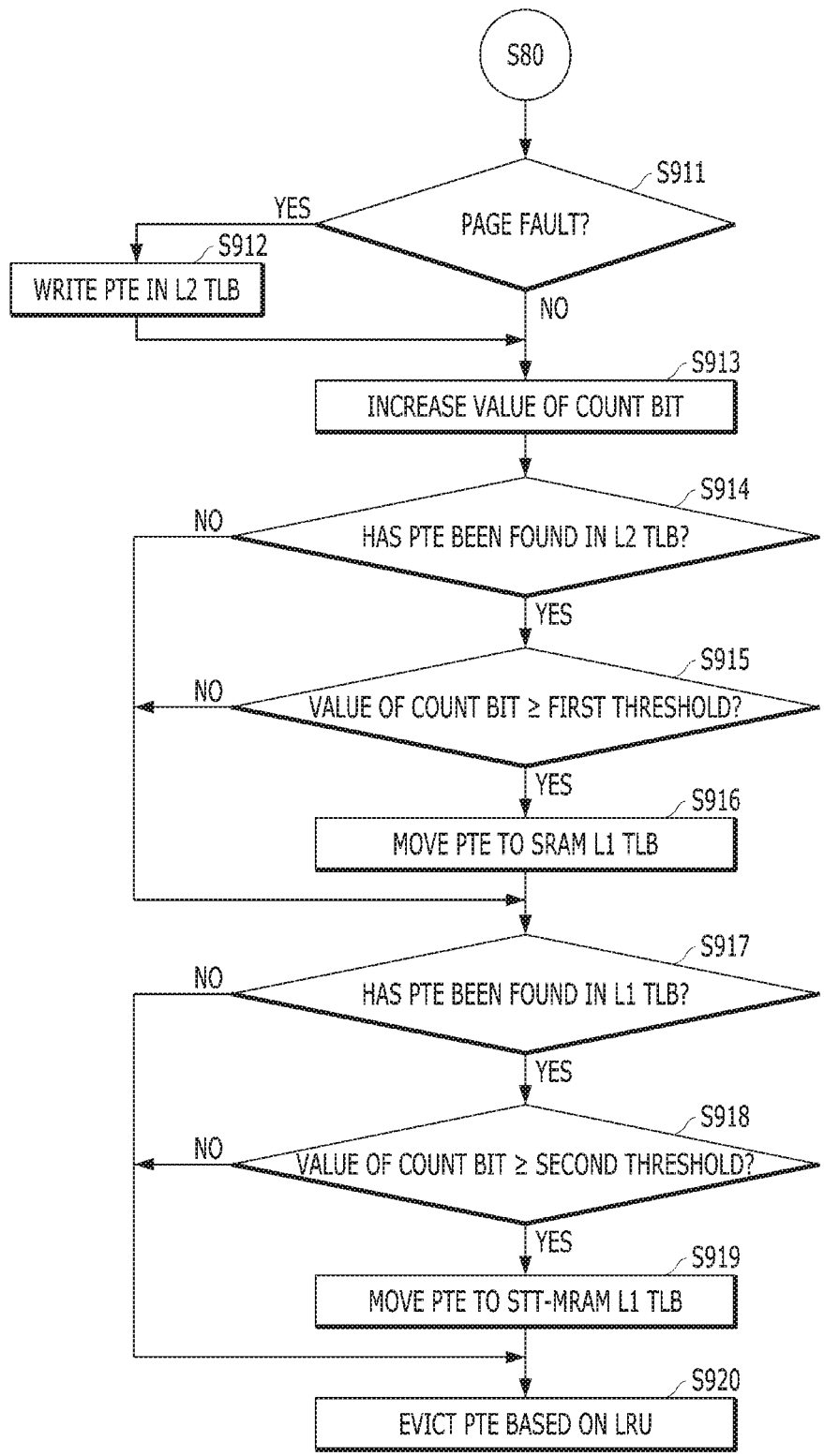

MEMORY MANAGEMENT DEVICE CAPABLE OF MANAGING MEMORY ADDRESS TRANSLATION TABLE USING HETEROGENEOUS MEMORIES AND METHOD OF MANAGING MEMORY ADDRESS THEREBY

CROSS-REFERENCE TO RELATED APPLICATION

This application claims priority under 35 U.S.C. § 119 to Korean Patent Application No. 10-2019-0119553, filed on Sep. 27, 2019, which is incorporated herein by reference in its entirety.

BACKGROUND

1. Field

Embodiments relate to a memory management device and a method of managing a memory address thereby, and more particularly, to a memory management device capable of managing a memory address translation table using heterogeneous memories and a method of managing a memory address thereby.

2. Discussion of the Related Art

In general, a computer system is configured to include various devices, e.g., a central processing unit (CPU) and a main memory.

Various non-memory devices within the computer system including the CPU and a graphics processing unit (GPU) access a memory using a virtual memory address for compatibility and efficiency. To this end, the computer system may include a translation lookaside buffer (TLB) in which a page table for translating the virtual memory address into a physical address is stored. The TLB is used as a memory management device or component or part thereof.

Some devices may include an internal memory independently of the main memory. The GPU is one such device.

FIG. 1 schematically illustrates a structure of a device including TLBs.

FIG. 1 illustrates a GPU 100 as an example of the device, and illustrates only some elements thereof.

As illustrated in FIG. 1, the GPU 100 may include multiple streaming multiprocessors (SMs) 110 configured to perform independent operations and a global memory 120, that is, an internal shared memory. Each of the multiple SMs 110 includes multiple stream processors (SPs) 111 capable of processing multiple threads at the same time with respect to a single instruction.

Each of the multiple SMs 110 includes multiple SPs 111, and may be executed according to a single instruction multiple thread (SIMT) method of processing a warp (also called a wavefront), that is, a set of threads corresponding to a multiplier of 2, such as 32 or 64, as a single instruction.

Each of the multiple SMs 110 obtains data by accessing a memory in order to perform an operation according to an instruction. In this case, as described above, a virtual memory address needs to be translated into an actual physical memory address. To this end, each of the multiple SMs 110 includes an L1 TLB 112. The GPU 100 includes an L2 TLB 130 shared by the multiple SMs 110.

Each of the L1 and L2 TLBs 112 and 130 includes a page table. The page table is configured with multiple page table entries (PTEs) in which virtual memory addresses and corresponding physical addresses are written. TLB is a kind of address cache provided to rapidly translate a frequently used virtual memory address into a physical address, and primarily stores recently used PTEs.

A case where the TLB searches the page table for and finds a page corresponding to a virtual memory address, that is, a PTE is called a page hit. A case where the TLB does not find a page corresponding to a virtual memory address, that is, a PTE is called a page fault. Upon page hit, the L1 TLB 112 searches for a corresponding L1 cache memory 113 using a physical address corresponding to a virtual memory address. When the data of the corresponding physical address is present in the L1 cache memory 113, the L1 TLB 112 selects the data. In contrast, when the data of the corresponding physical address is not present in the L1 cache memory 113, the L1 TLB 112 selects data by sequentially searching an L2 cache 140 and the global memory 120.

When a page fault occurs in the L1 TLB 112, the L2 TLB 130 having a lower speed than the L1 TLB 112 searches for a PTE corresponding to the virtual memory address and then sequentially searches the global memory 120 for the corresponding page.

When a page hit does not occur with respect to all threads within a warp, that is, when data is not loaded, total throughput of the GPU 100 is decreased because the entire warp is not executed. Particularly, the GPU executed according to the SIMT method is more influenced by the page hit rate of the TLB than the CPU because the GPU has a larger number of simultaneous accesses to a memory compared to the CPU.

Accordingly, performance of the GPU can be significantly improved as more PTEs are stored in a TLB, particularly, the L1 TLB 112. Furthermore, as the storage capacity of a memory of the GPU 100 is gradually increased, the size of a page of the GPU and the size of the TLB are also increased. Accordingly, it is necessary to implement the L1 TLB 112 using a high-density energy-efficient memory.

Conventionally, in general, the L1 TLB 112 is configured as a static random access memory (SRAM) in order to enable rapid access. The SRAM has an advantage of providing high access speed, but has limits in that it cannot store many PTEs relative to its area due to a low density and data stored in the SRAM is lost upon power-off because the SRAM is a volatile memory.

SUMMARY

Various embodiments are directed to providing a memory management device and method of managing a memory address thereof, which can increase a throughput by raising a page hit rate.

Also, various embodiments are directed to providing a memory management device and method of managing a memory address thereof, which can increase a storage capacity and reduce power consumption by configuring a TLB using a static random access memory (SRAM) and a spin-transfer torque magnetic random access memory (STT-MRAM) and can suppress an increase in TLB update time, which occur due to the use of the STT-MRAM.

In an embodiment, a memory management device may include a first translation lookaside buffer (TLB) implemented as a static random access memory (SRAM) and suitable for storing a page table configured with multiple page table entries (PTEs) for translating, into a physical memory address, a virtual memory address applied by at least one corresponding processor, and a second TLB implemented as a spin-transfer torque magnetic random access memory (STT-MRAM) and suitable for receiving and storing the PTE of a hot page, having a relatively high frequency of use, among the multiple PTEs stored in the first TLB.

When the virtual memory address is applied by the at least one corresponding processor, the first TLB and the second TLB may simultaneously search for PTEs corresponding to the applied virtual memory address and translate the virtual memory address into the physical memory address.

The second TLB may have a greater storage capacity than the first TLB.

When a PTE corresponding to the virtual memory address is found in the search, the first TLB may increase a count of the retrieved PTE and transmit, to the second TLB, a PTE whose count is greater than or equal to a threshold.

The second TLB may have a storage space in which the PTE is stored and which is divided into an upper space and a lower space and store, in one of the upper space and the lower space, the PTE transmitted by the first TLB, based on the least significant bit (LSB) of a TLB tag in the virtual memory address.

The memory management device may further include a page table walker suitable for generating a PTE by translating the virtual memory address into a physical memory address using a set method when the PTE is not found in the first TLB and the second TLB and adding the count to the generated PTE.

The page table walker may transmit and store the generated PTE into the first TLB.

The memory management device may be implemented as a graphics processing unit (GPU) including multiple streaming multiprocessors each including multiple stream processors.

The first TLB and the second TLB comprises multiple instances respectively, and at least one instance of each of the first TLB and the second TLB may be included in each of the multiple streaming multiprocessors.

In another embodiment, a method of managing a memory address by a memory management device may include, when a virtual memory address is applied by at least one corresponding processor, simultaneously searching, by a first TLB and a second TLB, a page table, which is configured with multiple page table entries (PTEs) previously stored, for a PTE corresponding to the applied virtual memory address, in order to translate the virtual memory address into a physical memory address, the first translation lookaside buffer (TLB) implemented as a static random access memory (SRAM) and the second TLB implemented as a spin-transfer torque magnetic random access memory (STT-MRAM), and transmitting the PTE of a hot page, having a relatively high frequency of use, among the multiple PTEs stored in the first TLB, so that the PTE is stored in the second TLB.

In an embodiment, a system includes: multiple stream processors, each stream processor including a first translation lookaside buffer (TLB) implemented as a static random access memory (SRAM), and a second TLB implemented as a spin-transfer torque magnetic random access memory (STT-MRAM), wherein the first TLB stores multiple page table entries (PTEs), and wherein the stream processor: selects a hot PTE having a relatively high frequency of access count among the multiple PTEs in the first TLB; stores the hot PTE in the second TLB; simultaneously searches the first TLB and the second TLB for a PTEs corresponding to a virtual memory address; and translates the virtual memory address into a physical memory address using the PTE found in the search.

BRIEF DESCRIPTION OF THE DRAWINGS

FIG. 7 is a flowchart specifically illustrating a translation lookaside buffer (TLB) update operation in FIG. 6.

DETAILED DESCRIPTION

Figure 1:
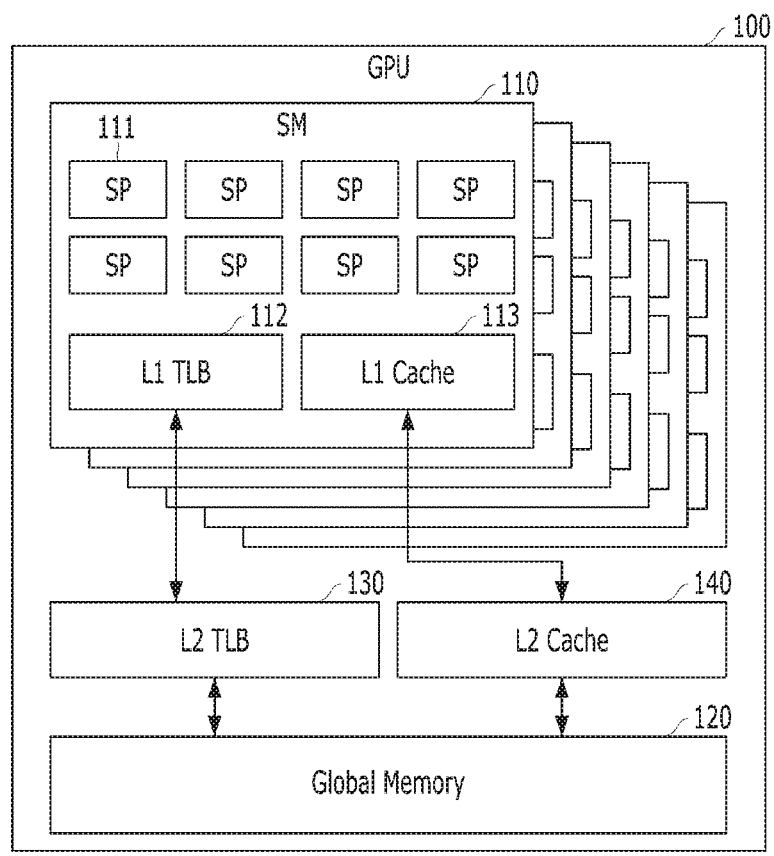
FIG. 1 illustrates a schematic structure of a device including translation lookaside buffers (TLBs).

Features and operational advantages of the present disclosure and how they are achieved are described with reference to the accompanying drawings.

Although various embodiments are disclosed herein, the present disclosure may be implemented in various different ways. Thus, the present invention is not limited to described embodiments. Furthermore, in order to clearly describe the present disclosure, well known material is omitted. The same reference numerals are used throughout the specification to refer to the same or like parts.

Throughout the specification, when it is said that a component or the like "includes" an element, the component may include one or more other elements, unless explicitly stated to the contrary. Furthermore, a term such as "module" when used herein means a component that performs at least one function or operation, and which may be implemented by hardware or software or a combination of hardware and software. Also, throughout the specification, reference to "an embodiment," "another embodiment," "the present embodiment" is not necessarily to only one embodiment, and different references to any such phrase are not necessarily to the same embodiment(s). The term "embodiments" when used herein does not necessarily mean all embodiments.

In the present disclosure, in order to overcome the limit of the existing L1 translation lookaside buffer (TLB) implemented as an SRAM, an L1 TLB of a device is implemented using a spin-transfer torque magnetic random access memory (STT-MRAM) together with an SRAM.

STT-MRAM is a nonvolatile memory having read latency similar to that of SRAM and has higher density and less energy consumption for a read operation than SRAM. That is, STT-MRAM has advantages in that more data can be stored in the same area and power consumption can be reduced.

Table 1 illustrates the results of analysis of characteristics when TLBs are configured with an SRAM and an STT-MRAM.

TABLE 1

| | TLB Config. | | | | | |
|---|---|---|---|---|---|---|
| | TLB Config. 1 | | | TLB Config. 2 | | |
| | | STT-MRAM | | | STT-MRAM | |
| Technology | SRAM (1K) | 1T1J (4K) | 2T2J (2K) | SRAM (16K) | 1T1J (64K) | 2T2J (32K) |
| Memory Area (mm²) | 0.037 | 0.043 | 0.043 | 0.434 | 0.505 | 0.505 |
| Sensing Time (ns) | 0.49 | 1.13 | 0.71 | 0.49 | 1.13 | 0.71 |
| Total Read Time (ns) | 1.78 | 1.81 | 1.39 | 7.24 | 6.78 | 6.36 |
| Total Write Time (ns) | 2.48 | 11.37 | 11.37 | 6.89 | 14.02 | 14.02 |
| Read Energy (nJ) | 0.12 | 0.06 | 0.06 | 0.13 | 0.09 | 0.09 |
| Write Energy (nJ) | 0.13 | 0.39 | 0.79 | 0.15 | 0.49 | 0.98 |
| Leakage Power (nW) | 62.49 | 21.86 | 21.86 | 522.67 | 157.48 | 157.48 |

In the STT-MRAM of Table 1, one magnetic tunnel one junction (1T1J) and two magnetic tunnel two junction (2T2J) indicate STT-MRAMs divided based on differential sensing methods.

Referring to Table 1, it may be seen that in the same memory area, 1T1J STT-MRAM has a storage capacity four times greater than that of SRAM and 2T2J STT-MRAM has a storage capacity two times greater than that of SRAM. Moreover, 1T1J STT-MRAM and 2T2J STT-MRAM have a read time to the same as or faster than that of SRAM. That is, when L1 TLB is implemented using STT-MRAM, there are advantages in that more PTEs can be stored and the page hit rate can be significantly increased.

Furthermore, the STT-MRAM can reduce power consumption of the TLB because it has much lower read energy consumption than the SRAM.

However, as illustrated in Table 1, STT-MRAM has a write time four times greater than that of SRAM. That is, it takes a lot of time for a TLB update for writing a new PTE in TLB. Accordingly, when L1 TLB is implemented using only STT-MRAM, it is difficult to improve performance of TLB and thus the throughput of a device cannot be improved.

Figure 2:
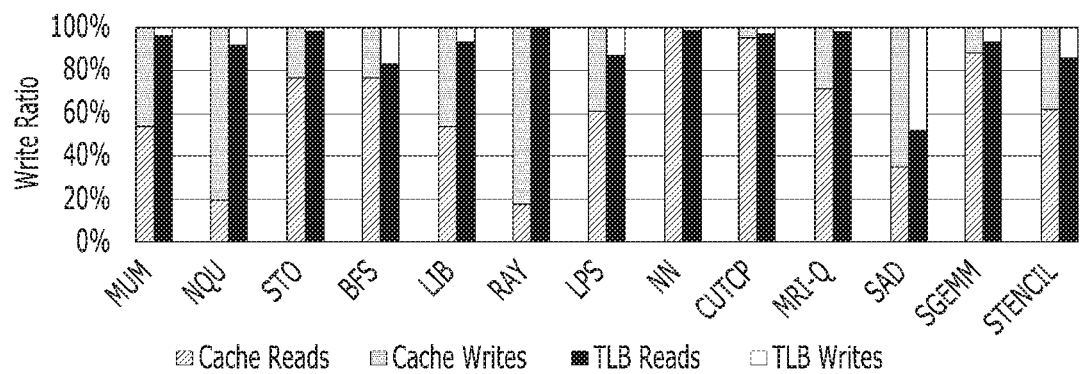
FIG. 2 illustrates the results of analysis of access to a cache and a translation lookaside buffer (TLB) of a device.
Figure 3:
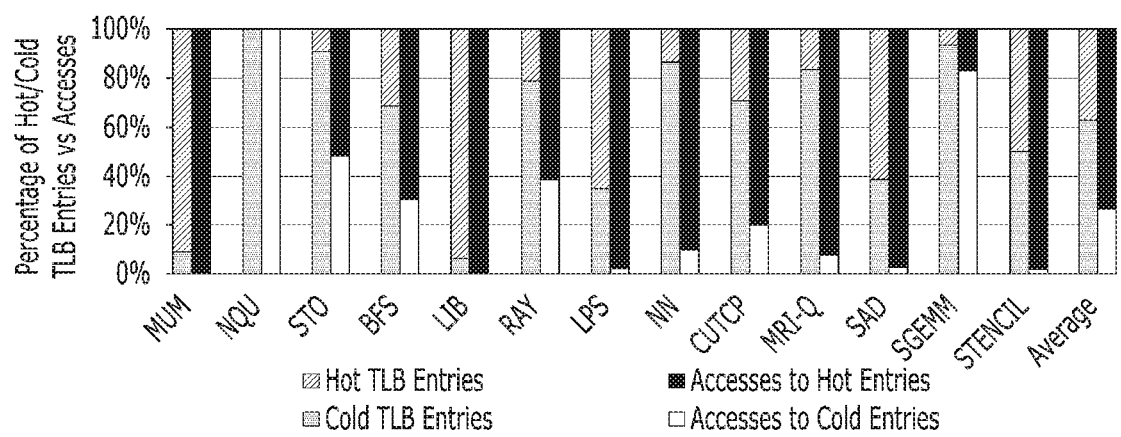
FIG. 3 illustrates the results of analysis of the ratio of hot pages and cold pages and the access rate of each of the hot pages and the cold pages in a TLB of a device.

FIG. 2 illustrates the results of analysis of access to a cache and TLB of a device. FIG. 3 illustrates the results of analysis of the ratio of hot pages and cold pages and the access rate of each of the hot pages and the cold pages in a TLB of a device.

FIGS. 2 and 3 illustrate the results of analysis of a GPU as an example of a device. FIG. 2 illustrates the results of analysis of a GPU cache and the read and write ratios of TLB obtained by using Parboil, which are GPU simulation benchmark suits commonly used as in a GPGPU-Sim (i.e., cycle-driven GPU simulator) program. In FIGS. 2 and 3, MUM, NQU, STO, BFS, LIB, RAY, LPS, NN, CUTCP, MRI-Q, SAD, SGEMM and STENCIL mean various benchmark program included in the benchmark suites. From FIG. 2, it may be seen that the PTEs of the TLB are much more frequently read than the data blocks of the cache, but they have a very low write ratio, according to the results of the analysis using the various benchmark programs.

Furthermore, from FIG. 3, it may be seen that the GPU more frequently accesses a hot page than a cold page having a relatively low frequency of access, according to the results of the analysis using the various benchmark programs.

In the present embodiment, the L1 TLB is implemented using both SRAM and STT-MRAM by considering the characteristics of the GPU illustrated in FIGS. 2 and 3 as described above, but the TLB is updated using a method of writing, in the SRAM, a PTE to be stored in the L1 TLB and then storing, in the STT-MRAM, only a hot page among PTEs stored in the SRAM so that the disadvantages of the SRAM and STT-MRAM are reduced and the advantages thereof are further increased.

In this case, it is assumed that the STT-MRAM included in the L1 TLB is applied to the 2T2J STT-MRAM. The 2T2J STT-MRAM has a lower storage capacity than the 1T1J STT-MRAM in the same area and has the same write time as the 1T1J STT-MRAM, but has advantages such as a shorter read time and a lower error rate. However, the present invention is not limited to the 2T2J STT-MRAM; the 1T1J STT-MRAM may be applied.

Figure 4:
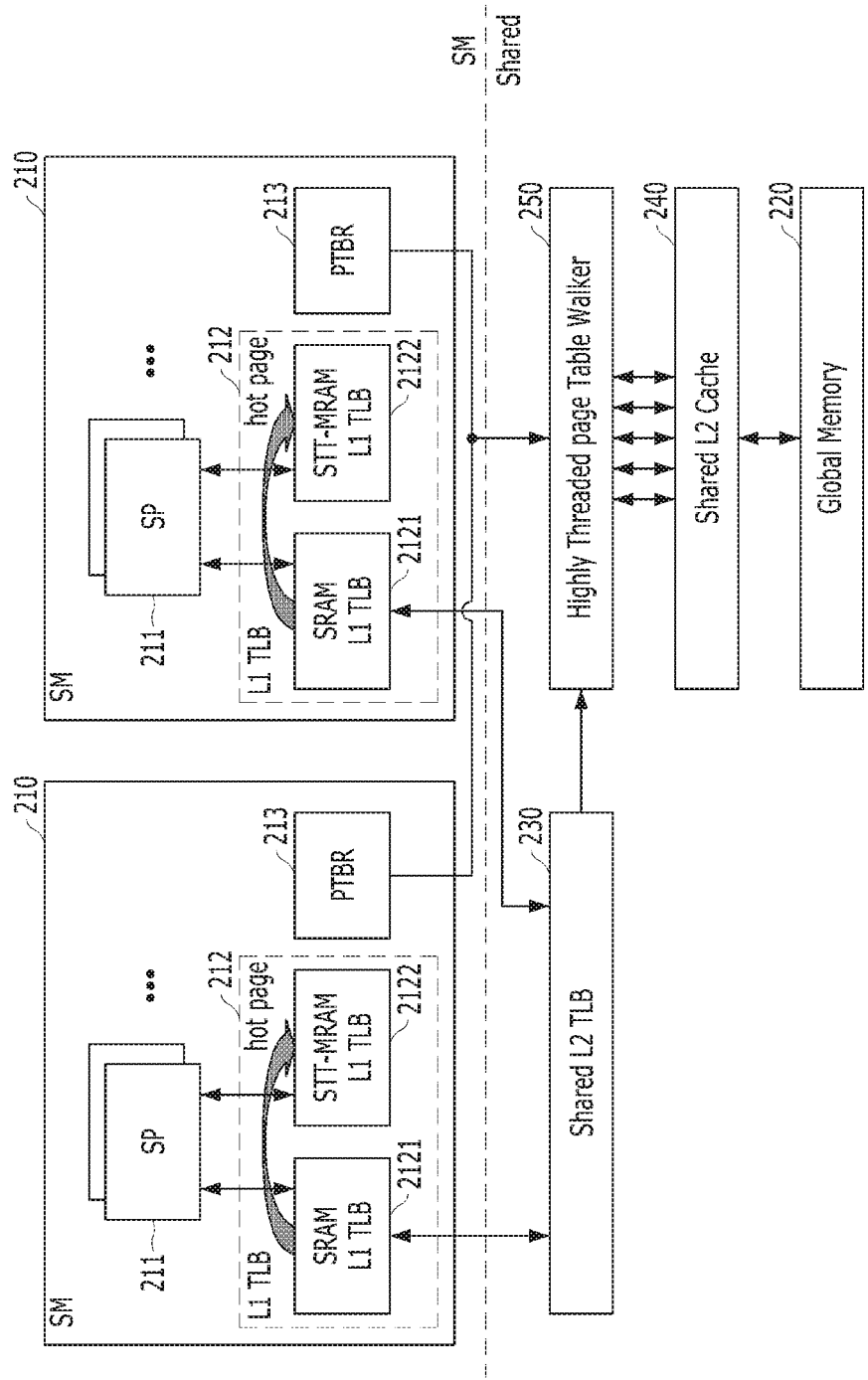
FIG. 4 illustrates a schematic structure of a device including TLBs according to an embodiment.

FIG. 4 illustrates a schematic structure of a device including TLBs according to an embodiment. FIG. 4 illustrates a GPU as an example of the device, and for clarity illustrates only some elements of the GPU.

Referring to FIG. 4, the GPU includes multiple streaming processors (SMs) 210 as in FIG. 1. Each of the multiple SMs 210 may include multiple stream processors (SPs) 211, an L1 TLB 212 and a page table base register (PTBR) 213. Particularly, in the present embodiment, the L1 TLB 212 may include a first L1 TLB 2121 and a second L1 TLB 2122 implemented as different heterogeneous memories. That is, the L1 TLB 212 may be implemented as a hybrid memory. For example, the first L1 TLB may be implemented as an SRAM, and the second L1 TLB may be implemented as an STT-MRAM.

When a virtual memory address to be read from the multiple SPs 211 is transmitted, the L1 TLB 212 searches for PTEs stored in the first L1 TLB 2121 and the second L1 TLB 2122, respectively. Furthermore, when a PTE corresponding to the virtual memory address is found in the first L1 TLB 2121 or the second L1 TLB 2122, the L1 TLB 212 translates the virtual memory address into a physical memory address based on the retrieved PTE.

The second L1 TLB 2122 of the L1 TLB 212 is implemented as an STT-MRAM having high density, and thus may store more PTEs in the same area. Accordingly, the hit rate of the L1 TLB 212 is greatly increased, which may significantly improve the throughput of a device. Furthermore, the power consumption and the read time of the L1 TLB 212 may be reduced due to a short read time and small power consumption of the STT-MRAM.

When a PTE corresponding to the virtual memory address is not found in either the first L1 TLB 2121 or second L1 TLB 2122 of the L1 TLB 212, the L1 TLB 212 searches an L2 TLB 230, that is, a shared TLB shared by the multiple SMs 210, for a PTE corresponding to the virtual memory address. When the PTE is found in the L2 TLB 230, the L1 TLB 212 translates the virtual memory address into a physical memory address. However, when the PTE is not found even in the L2 TLB 230, a page table walker 250 accesses an L2 cache 240, that is, a shared cache, and a global memory 220, obtains the PTE corresponding to the virtual memory address, and updates a TLB with the obtained PTE.

In this case, the page table walker 250 may receive the start address of a page table stored in the PTBR 213, and may search for the PTE. Furthermore, the page table walker 250 may add, to the PTE, a count bit C having a set number of bits. The page table walker 250 may update the L2 TLB 230 by transmitting the PTE to the L2 TLB 230.

Furthermore, the L2 TLB 230 increases a count bit C whenever a corresponding PTE is found, that is, whenever the PTE is found in at least one SM 210. When the PTE count bit C reaches a set first threshold, the L2 TLB 230 may update the L1 TLB 212 by transmitting the PTE to the L1 TLB 212.

In this case, the L2 TLB 230 updates the L1 TLB 212 by transmitting the PTE to the first L1 TLB 2121 of the L1 TLB 212. The reason for this is that the first L1 TLB 2121 implemented as an SRAM has a much shorter write time than the second L1 TLB 2122 implemented as an STT-MRAM.

That is, in the present embodiment, the first L1 TLB 2121 is implemented as an SRAM, and the update of a PTE for the L1. TLB 212 is performed only in the first L1 TLB 2121. Accordingly, an increase in write time which may occur due to the second L1 TLB 2122 implemented as an STT-MRAM may be prevented.

In some cases, the L2 TLB 230 may be omitted. In this case, the page table walker 250 may update a TLB by transmitting a PTE to the first L1 TLB 2121.

Thereafter, the first L1 TLB 2121 increases a count bit C whenever a PTE is found. When the PTE count bit C reaches a set second threshold, the first L1 TLB 2121 transmits the PTE to the second L1 TLB 2122. That is, the first L1 TLB 2121 treats, as a hot page, a PTE having a count bit C higher than the second threshold, and stores the PTE in the second L1 TLB 2122.

The second L1 TLB 2122 implemented as an STT-MRAM has a longer write time. However, the relatively low write speed may be offset because multiple devices including GPUs more frequently access a hot page having high frequency access, as illustrated in FIG. 3. Particularly, a reduction in the throughput of a device attributable to an increase in write time may be suppressed by the second L1 TLB 2122 implemented as an STT-MRAM because a PTE is first updated in the first L1 TLB 2121 and then written in the second L1 TLB 2122 only when the PTE is found a set number of times or more.

When moving a PTE to the second L1 TLB 2122, the first L1 TLB 2121 may transmit the PTE to the second L1 TLB 2122, which is divided into an upper space and a lower space, based on the least significant bit (LSB) of a TLB tag. This is for enabling more PTEs to be stored in the second L1 TLB 2122 than in the first L1 TLB 2121 because the first L1 TLB 2121 implemented as an SRAM and the second L1 TLB 2122 implemented as an STT-MRAM have different densities.

In some embodiments, the first L1 TLB 2121, the second L1 TLB 2122 and the L2 TLB 230 may evict a stored PTE. For example, the first L1 TLB 2121, the second L1 TLB 2122 and the L2 TLB 230 may sequentially evict PTEs in ascending order of hit frequency according to the least recently used (LRU) scheme so that other PTEs may be stored.

Figure 5:
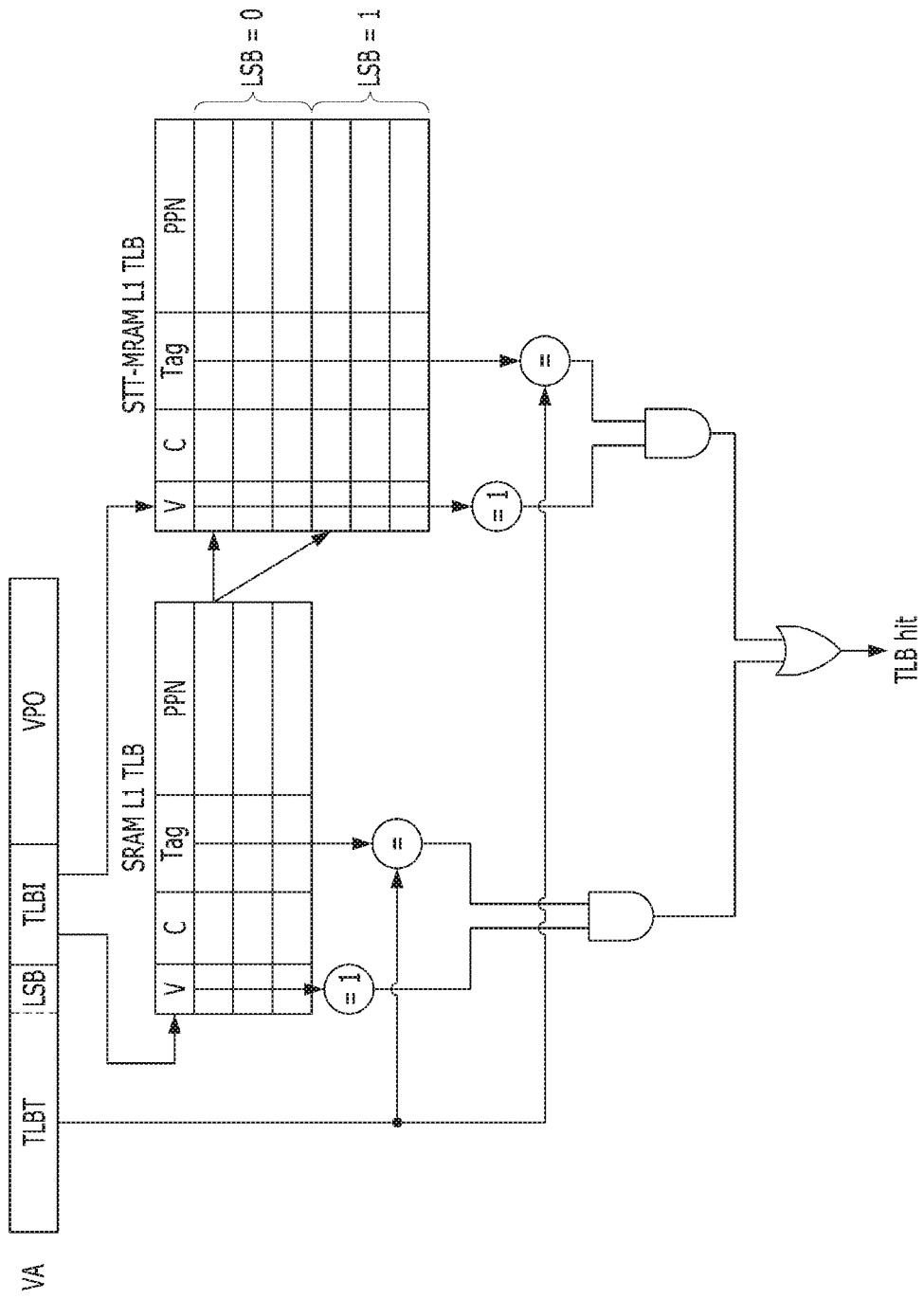
FIG. 5 illustrates the structures of a virtual memory address and page table in a hybrid TLB according to an embodiment.

FIG. 5 illustrates structures of a virtual memory address VA and a page table in the hybrid TLB according to an embodiment.

Referring to FIG. 5, the virtual memory address VA may be configured with a TLB tag (TLBT), a TLB index (TLBI), and a virtual page offset (VPO). TLBT and TLBT are values for selecting a specific PTE in a TLB in which a page table including multiple PTEs has been stored, and correspond to a tag in the page table of the TLB. VPO indicates a physical page offset.

Each of PTEs configuring the page tables of the first and second L1 TLBs 2121 and 2122 may be configured to include a valid hit V, a count bit C, a tag and a physical page number PPN. The valid bit V indicates whether a corresponding page is stored in a memory. The count bit C is a bit added to determine whether a corresponding page is a hot page. The tag indicates the address of each PTE in the page table, and may correspond to TLBT and the TLBI of the virtual memory address VA.

As illustrated in FIG. 5, when the virtual memory address VA is applied, each of the first and second L1 TLBs 2121 and 2122 searches for a PTE corresponding to the TLBI and determines whether the tag of the retrieved PTE is matched with the TLBT. Furthermore, each of the first and second L1 TLBs 2121 and 2122 determines whether the valid bit V of the retrieved PTE is 1. When the valid bit V of the PTE retrieved in at least one of the first and second L1 TLBs 2121 and 2122 is 1 and the tag thereof is matched with the TLBT, the first L1 TLB 2121 or the second L1 TLB 2122 notifies that a PTE corresponding to the virtual memory address VA has been hit, sequentially accesses the cache 240 and the global memory 220 based on a physical memory address obtained from the PTE, searches for data, and transmits the retrieved data to the SP 211 of the SM 210 to which the retrieved data corresponds.

When the count bit C of a specific PTE is a second threshold or more, the first L1 TLB 2121 moves the specific PTE to the second L1 TLB 2122. In some embodiments, the first L1 TLB 2121 may move the specific PTE to the upper or lower address space of the second L1 TLB 2122 with reference to a least significant bit (LSB) of the TLBT in the virtual memory address VA. For example, the first L1 TLB 2121 may move the specific PTE to the upper address space of the second L1 TLB 2122 when the LSB of the TLBT is 0, and may move the specific PTE to the lower address space of the second L1 TLB 2122 when the LSB of the TLBT is 1.

The present embodiment illustrates the GPU as an example of the device and illustrates that the hybrid TLB is included in each of the multiple SMs 210 as the L1 TLB 212, but the present disclosure is not limited thereto. The hybrid TLB may be included in various multiprocessors including multiple processors and may be configured to correspond to each of processors. For example, the hybrid TLB may also be applied to a device, such as a CPU including multiple core processors.

Figure 6:
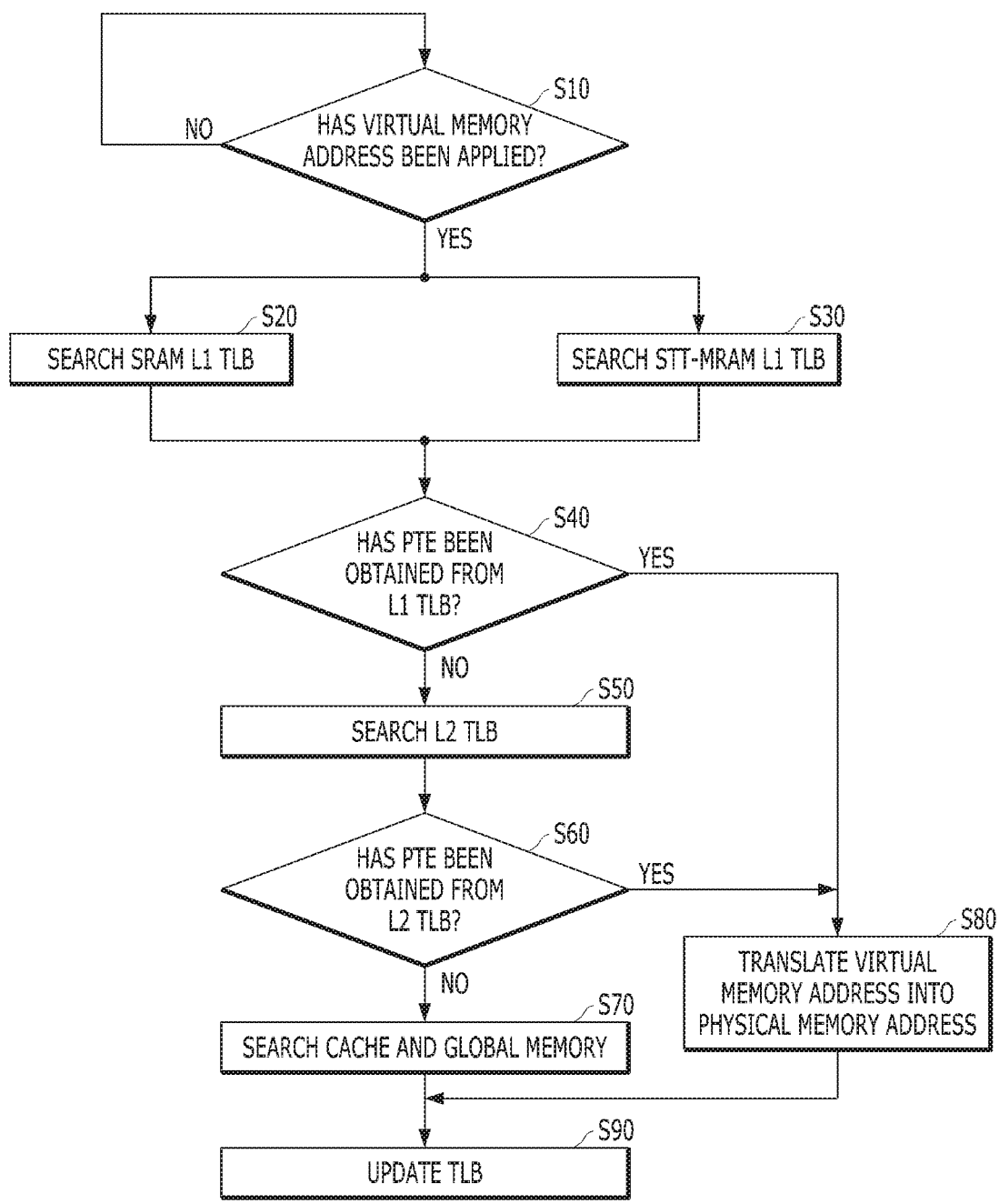
FIG. 6 is a flowchart illustrating a method of managing, by a memory management device, a memory address according to an embodiment.

FIG. 6 is a flowchart illustrating a method of managing, by a memory management device, a memory address according to an embodiment. FIG. 7 is a flowchart specifically illustrating a TLB update operation in FIG. 6.

In describing the method of FIGS. 6 and 7, it is assumed that the memory management device is configured to include at least one L1 TLB 212 and at least one L2 TLB 230. It is assumed that L1 TLB 212 is configured to include the first L1 TLB 2121 implemented as an SRAM and the second L1 TLB 2122 implemented as an STT-MRAM. However, in another embodiment, the L2 TLB 230 may be omitted.

The method of managing, by the memory management device, a memory address according to the present embodiment, which is illustrated in FIG. 6, is described with reference to FIGS. 4 and 5. L1 TLB 212 determines whether the virtual memory address VA is applied (S10). In this case, the virtual memory address VA may be applied by at least one corresponding processor. When the virtual memory address VA is applied, the first L1 TLB 2121 of the L1 TLB 212 searches a page table stored therein for a PTE corresponding to the virtual memory address VA (S20). At the same time, the second L1 TLB 2122 of the L1 TLB 212 also searches a page table stored therein for a PTE corresponding to the virtual memory address VA (S30). That is, the first L1 TLB 2121 and second L1 TLB 2122 of the L1 TLB 212 search PTEs corresponding to the applied virtual memory address VA in parallel at the same time.

Furthermore, the L1 TLB 212 determines whether a PTE corresponding to the virtual memory address VA is obtained from at least one of the first L1 TLB 2121 and the second L1 TLB 2122 (S40). When a PTE corresponding to the virtual memory address VA is not obtained, i.e., not found, the L2 TLB 230 searches a page table stored therein for a PTE corresponding to the virtual memory address VA (S50).

Furthermore, the L2 TLB 230 determines whether a PTE corresponding to the virtual memory address VA is obtained (S60). When a PTE corresponding to the virtual memory address VA is not found in the L2 TLB 230, the L1 TLB 212 translates the virtual memory address VA into a physical memory address PA using a set method, and searches the cache 240 and the global memory 220 (S70).

When a PTE corresponding to the virtual memory address VA is obtained in the L1 TLB 212 or the L2 TLB 230, the L1 TLB 212 or the L2 TLB 230 translates the virtual memory address VA into the physical memory address PA based on the obtained PTE, and sequentially accesses the cache 240 and the global memory 220 based on the translated physical memory address (S80).

Furthermore, the L1 TLB 212 or the L2 TLB 230 updates the TLB with a PTE based on the address of data obtained by searching the cache 240 and the global memory 220 or updates the TLB by moving a PTE stored in the L1 TLB 212 or the L2 TLB 230 (S90).

Referring to FIG. 7, the operation of updating the TLB (S80) is illustrated. First, the L1 TLB 212 or the L2 TLB 230 determines whether a page fault occurs because a PTE has not been found in the L1 TLB and the L2 TLB (S911). When the virtual memory address VA has been translated into a physical memory address PA using a set method because a page fault has occurred and the cache 240 or the global memory 220 has been accessed, the page table walker 250 obtains the PTE by which the virtual memory address VA and the physical memory address PA have been matched, and writes the PTE in the L2 TLB 230 (S912).

When it is determined that a page fault has not occurred in the L1 TLB 212 or the L2 TLB 230, the count bit C of the PTE is increased (S913). Furthermore, it is determined whether the PTE has been found in the L2 TLB 230 (S914). When it is determined that the PTE has been found in the L2 TLB 230, it is determined whether the count bit of the PTE is greater than or equal to a set first threshold (S915). When the count bit C is greater than or equal to the first threshold or more, the PTE stored in the L2 TLB 230 is moved to the L1 TLB 212, particularly, the first L1 TLB 2121 implemented as an SRAM and having a short write time (S916).

Furthermore, it is determined whether the PTE has been found in the L1 TLB 212 (S917). When it is determined that the PTE has been found in the L1 TLB 212, it is determined whether the count bit C of the PTE is greater than or equal to a set second threshold (S918). When the count bit C is greater than or equal to the second threshold, the PTE stored in the first L1 TLB 2121 is moved to the second L1 TLB 2122 (S919).

Furthermore, a storage space from which an additional PTE will be obtained is secured by evicting the PTEs stored in the L1 TLB 212 and the L2 TLB 230 using a set method. For example, the PTE may be evicted using the LRU scheme.

It is assumed that a TLB is divided into the L1 TLB 212 and the L2 TLB 230, but in another embodiment the L2 TLB 230 may be omitted. When the L2 TLB 230 is omitted, the operation S50 of searching the L2 TLB and the operation S60 of determining whether a PTE is obtained therefrom may be omitted. Furthermore, even in the operation S90 of updating the TLB, the operation S914 of checking whether a PTE is found in the L2 TLB to the operation S916 of moving the PTE to the first L1 TLB 2121 may be omitted.

Accordingly, in the GPU and method of managing a memory address thereof according to embodiments, TLBs are configured using an SRAM and an STT-MRAM, and thus storage capacity may be significantly improved compared to a case where a TLB is configured using an SRAM. Accordingly, the page hit rate of a TLB is increased, thereby improving the throughput of a device. Furthermore, after a PTE is first written in the SRAM, a PTE having high frequency of use is selected and moved to the STT-MRAM. Accordingly, an increase in TLB update time, which may occur due to the use of the STT-MRAM having a lower write speed, may be prevented. Furthermore, read time and read energy consumption may be reduced.

The method according to embodiments of the present disclosure may be implemented as a computer program stored in a medium for executing the method in a computer. In this case, the computer-readable medium may be accessible by a computer, and may include all suitable computer storage media. Examples of such computer storage media include all of volatile and nonvolatile media and separation type and non-separation type media implemented by a given method or technology for storing information, such as a computer-readable instruction, a data structure, a program module or other data, and may include a read only memory (ROM), a random access memory (RAM), a compact disk (CD)-ROM, a digital video disk (DVD)-ROM, a magnetic tape, a floppy disk, and an optical data storage device.

The present disclosure has been illustrated and described in connection with various embodiments, but the embodiments are merely exemplary. A person having ordinary skill in the art to which the present disclosure pertains will understand that various modifications and other equivalent embodiments are possible from the embodiments.

Accordingly, the present invention encompasses all variations that fall within the scope of the claims.

What is claimed is:
1. A memory management device comprising:
a first translation lookaside buffer (TLB) implemented as a static random access memory (SRAM) and suitable for storing a page table configured with multiple page table entries (PTEs) for translating, into a physical memory address, a virtual memory address applied by at least one corresponding processor; and
a second TLB implemented as a spin-transfer torque magnetic random access memory (STT-MRAM) and suitable for receiving and storing a PTE of a hot page, having a relatively high frequency of use, which is selected among the multiple PTEs stored in the first TLB, wherein the PTE in the second TLB is identical to one of the multiple PTEs in the first TLB,
wherein, when the virtual memory address is applied by the least one corresponding processor, the first TLB and the second TLB simultaneously search for PTEs corresponding to the applied virtual memory address and translate the virtual memory address into the physical memory address.

2. The memory management device of claim 1, wherein the second TLB has a greater storage capacity than the first TLB, so that the second TLB is capable of storing more PTEs than the first TLB.

3. The memory management device of claim 1, wherein, when a PTE corresponding to the virtual memory address is found in the search, the first TLB increases a count of the retrieved PTE and transmits, to the second TLB, a PTE whose count is greater than or equal to a set threshold.

4. The memory management device of claim 3, wherein the second TLB has a storage space in which the PTE is stored and which is divided into an upper space and a lower space, and stores, in one of the upper space and the lower space, the PTE transmitted by the first TLB, based on a least significant bit (LSB) of a TLB tag in the virtual memory address.

5. The memory management device of claim 3, further comprising a page table walker suitable for generating a PTE by translating the virtual memory address into a physical memory address using a set method when the PTE is not found in the first TLB and the second TLB and adding the count to the generated PTE.

6. The memory management device of claim 5, wherein the page table walker transmits and stores the generated PTE in the first TLB.

7. The memory management device of claim 1, wherein:
the memory management device is implemented as a graphics processing unit (GPU) comprising multiple streaming multiprocessors each comprising multiple stream processors, and
the first TLB and the second TLB comprises multiple instances respectively, and at least one instance of each of the first TLB and the second TLB is included in each of the multiple streaming multiprocessors.

8. The memory management device of claim 1, wherein a PTE in the first TLB is updated earlier than a PTE in the second TLB, regarding a same virtual memory address.

9. The memory management device of claim 8, wherein the PTE in the second PTE is updated when it is determined that an updated PTE in the first TLB is associated with the hot page, regarding the same virtual memory address.

10. A method of managing a memory address by a memory management device, the method comprising:
when a virtual memory address is applied by at least one corresponding processor, simultaneously searching, by a first TLB and a second TLB, a page table, which is configured with multiple page table entries (PTEs) previously stored, for a PTE corresponding to the applied virtual memory address, in order to translate the virtual memory address into a physical memory address, the first translation lookaside buffer (TLB) implemented as a static random access memory (SRAM) and the second TLB implemented as a spin-transfer torque magnetic random access memory (STT-MRAM); and
transmitting a PTE of a hot page, having a relatively high frequency of use, which is selected among the multiple PTEs stored in the first TLB, so that the PTE is stored in the second TLB, wherein the PTE in the second TLB is identical to one of the multiple PTEs in the first TLB.

11. The method of claim 10, wherein the transmitting of the PTE comprises:
increasing a count of a retrieved PTE when the PTE corresponding to the virtual memory address is found in the search; and
transmitting, to the second TLB having a greater storage capacity than the first TLB, a PTE whose count is greater than or equal to a set threshold.

12. The method of claim 11, wherein the transmitting of the PTE comprises:
storing, in one of an upper storage space and a lower storage space of the second TLB, the PTE transmitted by the first TLB, based on a least significant bit (LSB) of a TLB tag in the virtual memory address.

13. The method of claim 11, further comprising:
when the PTE is not found in the first TLB and the second TLB, generating a PTE by translating the virtual memory address into a physical memory address using a set method, and adding the count to the generated PTE; and
transmitting and storing, into the first TLB, the PTE to which the count has been added.

14. A system comprising:
multiple stream processors, each stream processor including a first translation lookaside buffer (TLB) implemented as a static random access memory (SRAM), and a second TLB implemented as a spin-transfer torque magnetic random access memory (STT-MRAM),
wherein the first TLB stores multiple page table entries (PTEs), and
wherein the stream processor:
selects a hot PTE having a relatively high frequency of access count among the multiple PTEs in the first TLB;
stores the hot PTE in the second TLB, wherein the PTE in the second TLB is identical to one of the multiple PTEs in the first TLB;
simultaneously searches the first TLB and the second TLB for a PTE corresponding to a virtual memory address; and
translates the virtual memory address into a physical memory address using the PTE found in the search.

* * * * *